US006269772B1

United States Patent
Mickey

(12) United States Patent
(10) Patent No.: US 6,269,772 B1
(45) Date of Patent: Aug. 7, 2001

(54) LITTER BOX OPTIMIZED FOR RECYCLING LITTER MATERIAL

(76) Inventor: Neil T. Mickey, 2965 S. Delaware Ave., #2, Milwaukee, WI (US) 53207

( * ) Notice: Subject to any disclaimer, the term of this patent is extended or adjusted under 35 U.S.C. 154(b) by 0 days.

(21) Appl. No.: 09/425,457

(22) Filed: Oct. 22, 1999

(51) Int. Cl.⁷ ............................... A01K 1/01; B65D 8/18
(52) U.S. Cl. ..................... 119/166; 119/168; 220/4.23
(58) Field of Search ..................... 119/166, 161, 119/165, 168, 167; 220/4.22, 4.23

(56) References Cited

U.S. PATENT DOCUMENTS

| 4,325,822 | * | 4/1982 | Miller . | |
|---|---|---|---|---|
| 4,646,684 | * | 3/1987 | Embry | 119/167 |
| 5,012,765 | * | 5/1991 | Naso et al. | 119/166 |
| 5,032,254 | * | 7/1991 | Deboer et al. | 209/10 |
| 5,168,834 | * | 12/1992 | Buschur | 119/166 |
| 5,211,133 | * | 5/1993 | Foley | 119/166 |
| 5,375,734 | * | 12/1994 | Tiramani | 220/523 |
| 5,402,751 | * | 4/1995 | Chevrotiere | 119/166 |
| 5,531,186 | * | 7/1996 | Flood et al. | 119/166 |
| 5,577,462 | * | 11/1996 | Korth | 119/166 |
| 5,598,810 | * | 2/1997 | Lawton, III | 119/166 |
| 5,727,691 | * | 3/1998 | Vittrup | 209/235 |
| 6,095,088 | * | 8/2000 | Savicki | 119/166 |

* cited by examiner

Primary Examiner—Charles T. Jordan
Assistant Examiner—Yvonne R. Abbott

(57) ABSTRACT

A cat litter system allows a pet owner to recycle unused cat litter without coming into contact with the used cat litter. The cat litter system includes a cover, a base and a screen. The cover engages the base over the screen. The system is rotated to pass unused cat litter through the screen into the cover which is then used as the base. The used cat litter is trapped by the screen and can easily be removed and thrown in a garbage receptacle.

20 Claims, 4 Drawing Sheets

LITTER BOX OPTIMIZED FOR RECYCLING LITTER MATERIAL

BACKGROUND OF THE INVENTION

The present invention relates to a litter box for a household pet or other animal. More particularly, the present invention relates to a litter box which is optimized for cleaning and reusing litter material.

A litter box, such as a cat litter box, is typically a plastic or other material container having an opening. The litter box is filled with litter material such as a clumping cat litter type or a sand type material (e.g. clumping type material. A pet, such as a cat, can provide waste through the opening of the container and into the litter material. The waste can include excrement as well as urine.

The litter material reduces the aroma of the waste and absorbs the more liquefied forms of the waste. The litter box is emptied into a refuse container to remove the used litter material which is often unsightly and can have an offensive smell.

Typically, the removal of cat litter material from a litter box is an undesirable task due to the smell associated with the waste from the animal. Often, the pet owner can come in contact with excrement and used litter material as the litter material is dumped into the garbage. Additionally, a large amount of unused litter material is often wasted as the pet owner throws away the entire contents of the litter box, feces and clumped litter material associated with urination. Alternatively, the pet owner must scoop out the used litter material manually to save the remaining unused portions of the litter material.

Thus, there is a need for a litter box which allows a user to efficiently throw away only the used litter material. Additionally, there is a need for a litter box which does not require the homeowner to contact used litter material.

SUMMARY OF THE INVENTION

The present invention relates to a litter box including a first section, a screen and a second section, litter material can be contained in the first section or the second section. When changing the litter material, the screen is applied over the section which includes the litter material. The first section is then placed onto the second section and rotated so the litter material falls through the screen into the opposite section. The screen is designed so clumped cat litter associated with urination and feces remain on top of the screen while the unused cat litter falls to the other side. The section which originally contained the cat litter can then be rotated so that the feces and clumped litter material falls into it and the first section can be utilized to throw away the feces and clumped litter material. This process can then be repeated wherein the second section is utilized to throw away the used litter material.

The present invention relates to a litter box system comprising a first section, a second section and a screen. The screen has apertures which allow unused litter material to pass through it. The screen is disposed between the first section and the second section. The first section is capable of covering the second section. Used litter material in the first section is prevented from entering the second section by the screen, and unused litter material enters the second section when the system is rotated.

The present invention further relates to a method of changing litter material in a litter box system. The litter box system includes a first section, a second section and a screen. The method includes placing a screen over an opening of the first section, covering the screen with the second section, rotating the litter box system so unused litter material falls through the screen to the second section, and uncovering the first section. The first section includes used litter material and unused litter material.

The present invention still further relates to a litter box comprising a first section means for holding used and unused litter material, a second section means for receiving the unused litter material, and a screen means for screening the used litter material. The first section means is covered by the second section means. The unused litter enters the second section means when the box is rotated. According to an exemplary aspect of the present invention, unused litter material can be recycled without requiring a pet owner to manually remove the used litter material. The box system is preferably hingeably coupled together by a hook hinge. The screen includes holes for a rod which can engage the hooked hinges.

BRIEF DESCRIPTION OF DRAWINGS

The invention will hereafter be described with reference to the accompanying drawings, wherein like numerals denote like elements, and.

DESCRIPTION OF PREFERRED EXEMPLARY EMBODIMENTS OF THE PRESENT INVENTION

Figure 1:
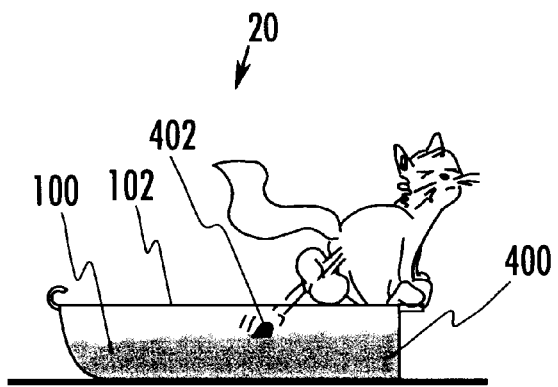
FIG. 1 is a schematic side view drawing of a pet utilizing a first section of the litter box system.

With reference to FIG. 1, a cat or other pet provides waste to a first section 100 of a litter box system 20. The waste may include feces and urine. The waste is absorbed by litter box material 400 in first section 100. The waste is provided through an opening 102 in the litter box. After the cat uses the litter box, litter material 400 includes used and unused litter material. The used litter material in material 400 is typically clumped due to the wetting actions associated with excrement and urine.

Figure 2:
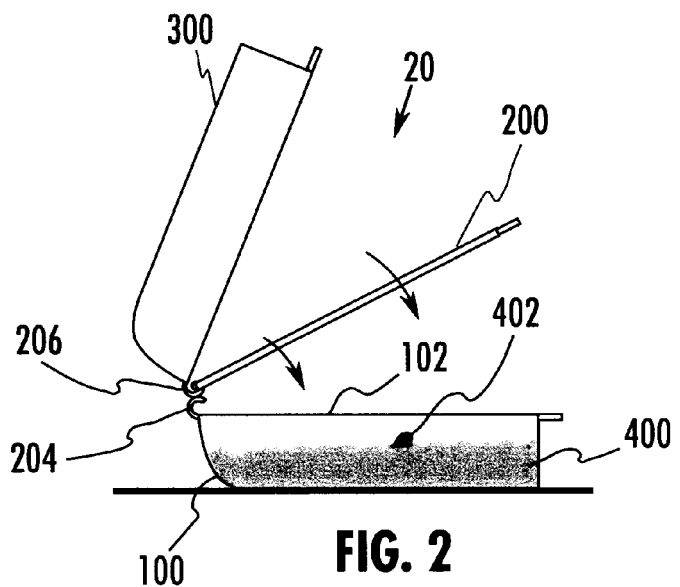
FIG. 2 is a schematic side view drawing of the litter box system including a first section, a second section and a screen.

With reference to FIG. 2, after the cat utilizes section 100, a screen 200 is placed over opening 102. Screen 200 can include holes to engage a hooked member 204 associated with section 100. Additionally, a second section 300 can be placed over screen 200 and section 100 to cover opening 102 of section 100. Section 300 also includes holes which engage hooked member 204. Alternatively, screen 200 can be coupled to sections 100 or 300.

Figure 3:
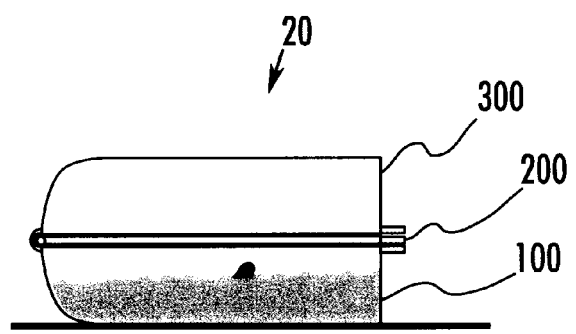
FIG. 3 is a schematic side view drawing of the litter box system illustrated in FIG. 2 wherein the first section covers the second section.
Figure 4:
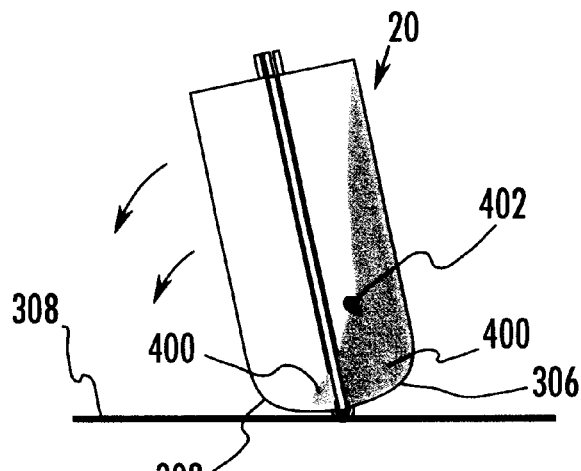
FIG. 4 is a schematic side view drawing of the litter box system illustrated in FIG. 3, wherein the litter box system is being rotated.
Figure 5:
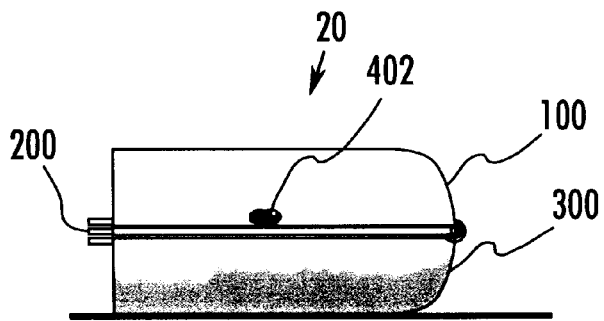
FIG. 5 is a schematic side view drawing of the litter box system illustrated in FIG. 4 wherein the litter box system is fully rotated.

With reference to FIG. 3, section 300 is closed over screen 200 and section 100. In FIG. 4, system 20 is rotated about round edges 302 and 306. Round edges 302 and 306 facilitate rotating system 20 on a surface such as a table or ground 308. After rotation, feces 402 and used cat litter 400 remain above screen 200 in section 100 of system 20, as shown in FIG. 5. Unused cat litter material associated with material 400 falls through screen 200 to section 300.

Figure 6:
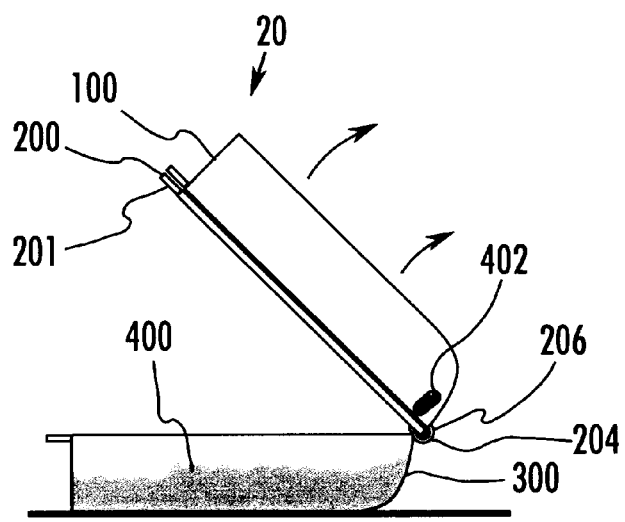
FIG. 6 is a schematic side view drawing of the litter box system wherein the first section is removed from the second section.

With reference to FIG. 6, after material 400 is transferred to section 300, section 100 can be hingeably rotated from section 300. Screen 200 should be maintained with section 100 thereby maintaining feces 402 and used cat litter material in section 100. Section 100 can be fully rotated about hooked members 204 and 206 so that feces material 402 rests at a bottom 406 of section 100. After section 100 is filly rotated, screen 200 can be removed from section 100 and used cat litter and feces 402 can be thrown in a garbage receptacle. Section 100 is removed from section 300.

Hooked members 206 and 204 can be replaced by any hingeable means. Alternatively, sections 300 and 100 can engage each other with other types of engagement systems. For example, a nonhingeable sealing system may be utilized. Screen 200 can be manually held at edge 201 (see FIG. 6) to maintain screen 200 with the appropriate section 100 or 300.

After throwing away feces 402, the cat can utilize section 300 in the same way that section 100 is utilized discussed with reference to FIG. 1. Litter 400 in system 20 would be changed in substantially the same way as discussed with reference to FIGS. 2–6.

Screen 200 advantageously allows a pet owner to change litter 400 without contacting used cat litter. Additionally, unused cat litter is advantageously recycled.

Figure 7:
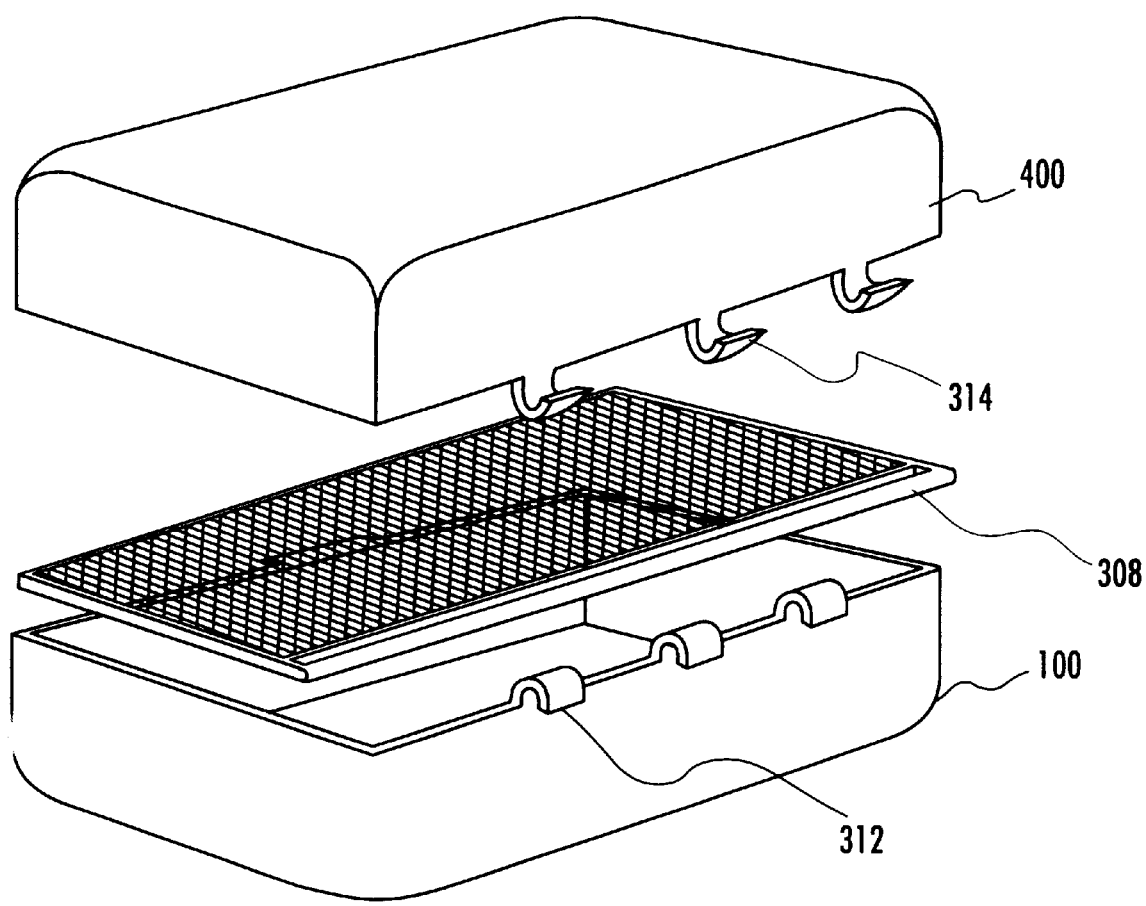
FIG. 7 is a schematic perspective view of the litter box system illustrated in FIG. 1.

Screen 200 can include apertures which engage hook members 206. Alternatively, screen 200 could include a rod which slides through hook members 204 and 206. In another alternative, a clamp, flexible member or other device could be utilized to hingeably engage section 100, section 300, and screen 200. Screen 200 preferably includes a large number of apertures arranged in an array. The apertures are preferably shaped in a diamond shape and have a size of at least ¼" per side. The apertures are generally large enough to allow unused cat litter to fall through and small enough to prevent used cat litter from passing through screen 200. Alternatively, any shape (e.g. circular, square, rectangular, etc.) of aperture can be utilized. System 20 is preferably made of plastic FIG. 7 shows a hinge and rod pivotal coupling between section 300 and section 100. A rod 308 can be disposed through hooks 312 and 314 to attach section 100 to section 300. Screen 200 can include a similar hook or other device for receiving rod 308. Alternatively, screen 200 can include a rod portion 212 for engaging hooks 312 and 314.

Figure 8:
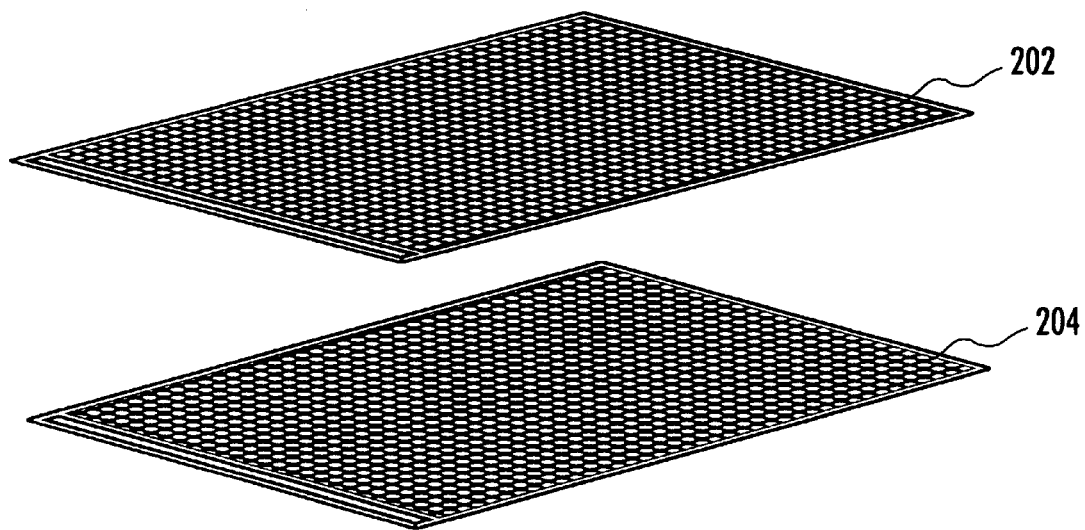
FIG. 8 is a perspective view of alternative embodiments for a screen element shown in FIG. 1.

FIG. 8 shows screen 202 and 204 having apertures with alternative sizes and shapes.

Figure 9:
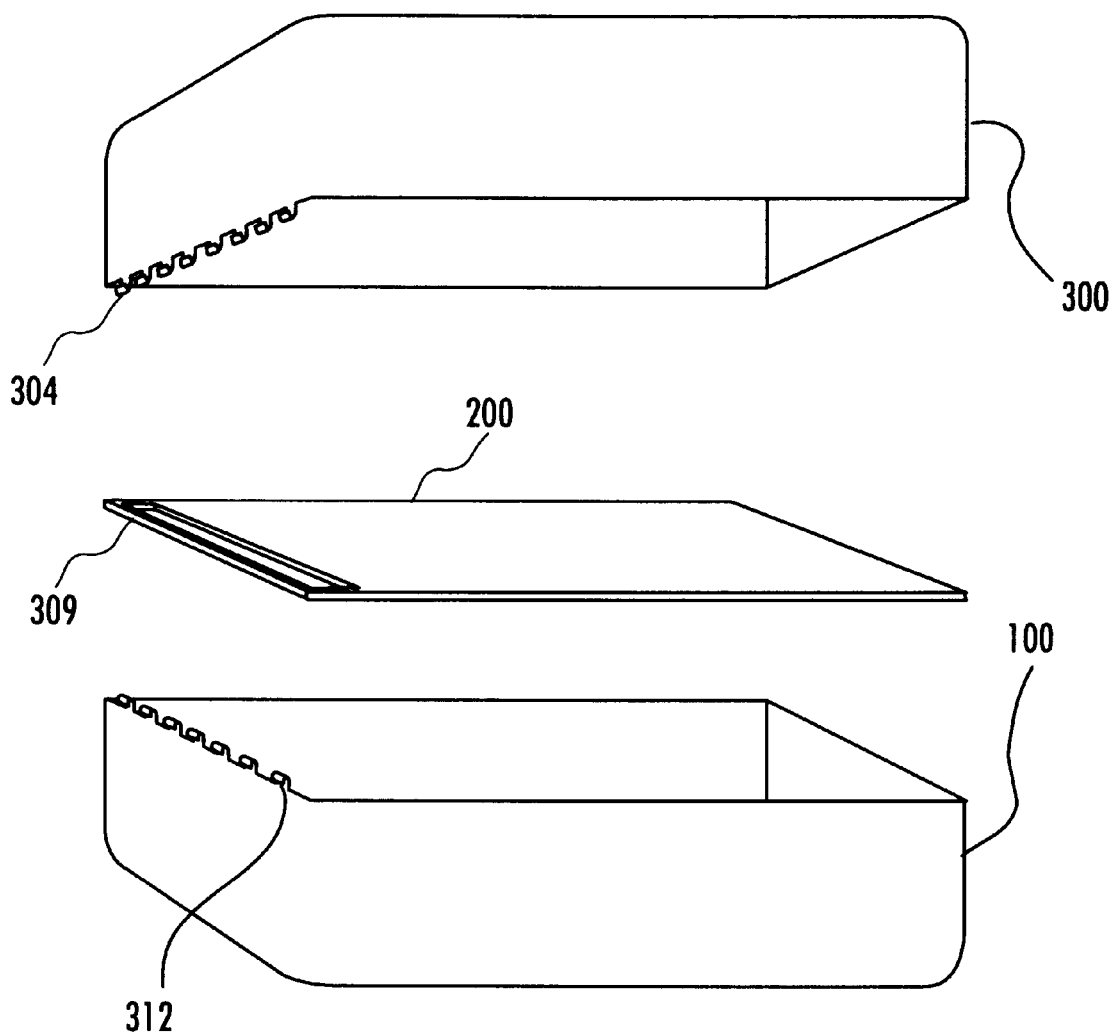
FIG. 9 shows an exploded perspective view schematic drawing of yet another exemplary embodiment of the litter box system.

FIG. 9 shows a litter box system wherein screen 200 includes an integral rod 309 for attaching to hook members 312 and 304. The system in FIG. 9 advantageously does not require extra parts which can be lost during the operation of the litter box system.

It is understood that while the detailed drawings, specific examples, material types, dimensions, and particular values given provide a preferred exemplary embodiment of the present invention, the preferred exemplary embodiments are for the purpose of illustration only. The method and apparatus of the invention is not limited to the precise details and conditions disclosed. For example, although specific types of aperture shapes are shown, other shapes can be utilized. Various changes may be made to the details disclosed without departing from the spirit of the invention which is defined by the following claims.

What is claimed is:

1. A litter box system, comprising:

a first section;

a second section; and a screen, the screen having apertures which allow unused litter material to pass through, the screen being disposed between the first section and the second section, the first section capable of covering the second section, whereby used litter material in a first section is prevented from entering the second section by the screen and unused litter material enters the second section when the system is rotated;

wherein the first section is detachable from the second section via a hooked hinge; and wherein the screen is attachable and detachable to the hooked hinge.

2. The litter box system of claim 1 wherein the screen is attachable with the first and second sections.

3. The litter box system of claim 2 wherein the apertures have diamond shape.

4. The litter box system of claim 3 wherein the apertures are at least ¼" wide.

5. The litter box system wherein the first section, second section and screen are plastic.

6. The litter box system of claim 1 wherein the first section and second section have a round edge for ease of rotation.

7. The litter box of claim 1 wherein the first section is plastic.

8. A method of changing litter material in a litter box system, the litter box system including a first section, a second section and a screen, wherein the first section and the second section are attachable by hooked hinges, and wherein the screen is attachable to the hooked hinges, the method comprising:

placing a screen over an opening in the first section, the first section including used and unused litter material, the screen being placed by rotating at the hooked hinges;

attaching the first section to the second section via the hooked hinge;

rotating the litter box system so unused litter material falls through the screen to the second section; and uncovering the first section by rotating at the hooked hinges.

9. The method of claim 8 further comprising:

removing the screen from the first section.

10. The method of claim 9 further comprising:

throwing the used litter material in the first section in a garbage receptacle.

11. The method of claim 8 wherein the hooked hinges are plastic.

12. The method of claim 11 wherein the screen is plastic.

13. The method of claim 8 wherein the uncovering step includes hingeably opening the first section and the screen from the second section.

14. The method of claim 8 wherein the system is plastic.

15. A litter box, comprising:

a first section means for holding used and unused litter material;

a second section means for receiving the unused litter material; and a screen means for screening the used litter material, the first section means being covered by the second section means, whereby the unused litter enters the second section means when the box is rotated;

wherein the first section means is detachable from the second section means via a hooked hinge; and wherein the screen means is attachable and detachable to the hooked hinge.

16. The litter box of claim 15 wherein the screen means is attachable and detachable with the first and second section means.

17. The litter box of claim 16 wherein the screen means has apertures having a square shape.

18. The litter box of claim 15 wherein the first section means and second section means are rectangular and have a round edge for ease of rotation.

19. The litter box of claim 15 wherein the first section means is plastic.

20. The litter box of claim 19 wherein the screen means is plastic.

\* \* \* \* \*